G. G. HENRY.
Cotton Drier.
No. 26,353.
Patented Dec. 6, 1859.
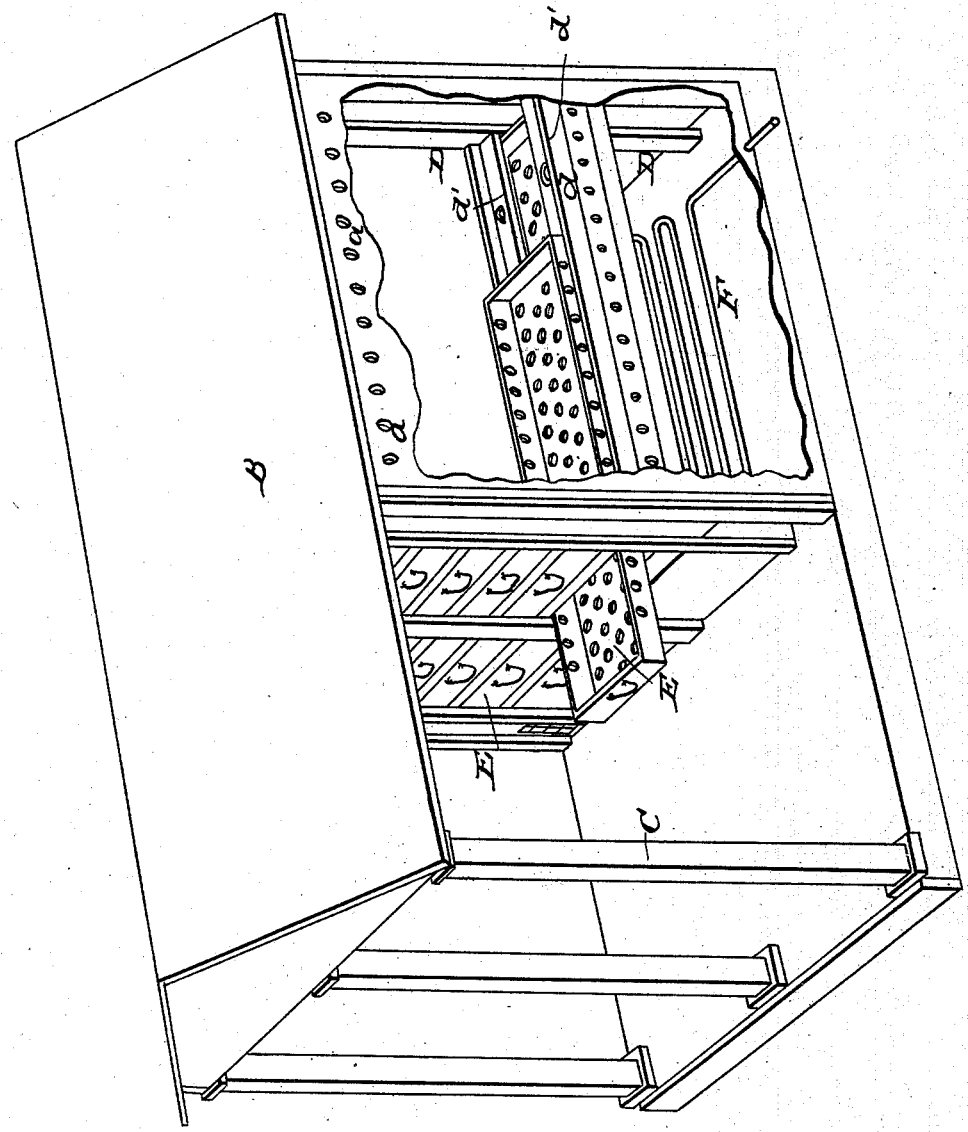
WITNESSES
INVENTOR

UNITED STATES PATENT OFFICE.

GEORGE G. HENRY, OF MOBILE, ALABAMA.

DRYING WET SEED-COTTON.

Specification of Letters Patent No. 26,353, dated December 6, 1859.

*To all whom it may concern:*

Be it known that I, GEORGE G. HENRY, of the city and county of Mobile, in the State of Alabama, have invented a new and useful Improvement in the Art of Saving Cotton, of which the following is a full, clear, and exact description, reference being had to the accompanying drawing, which makes part of this specification, and which represents a view in perspective of my drying house or closet, a portion of one of the side walls being broken away to show the arrangement of the apparatus contained therein, and one of the drawers being partially drawn out to show the details of its construction.

In order to show the advantages and profitableness of my improvement I will describe so much of the present mode of picking and saving the cotton crop, with its attendant disadvantages and losses, as relates to the subject matter of my invention.

As during the picking season, days and sometimes weeks of wet and cloudy weather intervene, the planter is compelled to get his crop out as rapidly as possible while the weather permits. The cotton, if damp or wet when picked, is spread on a scaffold prepared for that purpose. If, when this scaffold is full, it still continues, or threatens, to rain the operation of picking is necessarily suspended, lest the cotton should rot before the return of weather in which to dry it sufficiently for the purposes of housing, ginning or spinning. Much injury and loss is however sustained by picking when wet, in the hope of dry weather disappointed in which it becomes weakened or rotted because it is stowed away when not sufficiently dried. When large quantities of opened cotton are left in the field, on account of the weather continuing too wet to dry it, much of it is necessarily blown out of the bolls and lost, or by long exposed to rain, dust, and smoke, is much discolored and apt to be weakened in it fiber, making a low class of cotton which sells in the market for much less than the price it would have commanded if not subjected to this long exposure. Besides in the rich bottom lands, where the crops are generally very heavy, the certainty of this interruption to their picking by the weather, and the probability of their being forced to abandon much of the cotton, induce the planters to recklessly rush in their crop, gathering in their haste stems, bolls, &c., with the cotton that they may get it out, even in this injured state, by the time it is necessary to prepare for the succeeding crop. The whole of a crop, thus picked, is much reduced in value, and from the class it would be in, if this terrible mode were avoided. Even with all this haste, oftentimes when the time to prepare for planting comes around, much cotton remains unpicked in the field, and no matter how valuable it may be, it is totally abandoned. Sometimes even when the crop is not large the rainy weather continues so long that the cotton is injured in many ways and the planter is compelled to abandon it. In short, the loss to the planter, occasioned by the present mode of saving the crop, is immense, besides that sustained by the consumer who purchases goods made from this weakened fiber. It is also obvious that there must be many occasions during the picking season when operations are suspended from apprehension of rain and the consequent inability to dry the cotton; when could the planter have forseen the dry weather which ensued, much more cotton might have been picked, and serious annoyance as well as loss avoided.

By my new mode I obviate almost entirely this loss in quantity, quality and value, and enable the planter to offer to consumers an article in a great measure free from deterioration or injury by wet stowing or ginning, or from long exposure to the elements. To accomplish these objects I construct a house or closet of any suitable material and size, with three sides tightly closed (with the exception of small holes near the roof for the escape of the vapor produced by the evaporation of the moisture contained in the cotton) and the fourth capable of being closed as hereinafter described. Within this closet a series of drawers or shelves, upon which the wet seed-cotton is to be deposited, are arranged in such manner that they can readily be slid in and out to facilitate the deposition and removal of the cotton.

By means of suitable pipes or flues the room is heated to a sufficient degree to dry the cotton as rapidly as may be necessary. A temperature of from 120° to 130°, Fahrenheit, will be found sufficiently high for all practical purposes, and it is recommended that the latter degree of heat should not be exceeded. This matter can readily be regulated by placing a window in one side of the closet and suspending a thermometer within it in such position that it can be seen through it; and by cutting off the supply of heat when it exceeds the limit fixed.

As the cotton which is picked when wet is brought in from the field it is placed upon one of the drawers, which when full is run into the house, and another is drawn out and filled and returned; this process being repeated until all the cotton is so placed. These drawers are so constructed that when run into the house, they tightly close up its front, so as to prevent any undue waste of heat. This latter may be derived from the waste heat or steam of the engine, where one is used upon the plantation, or from any suitable heating apparatus where an engine is not used.

It may perhaps not be out of place to remark here that it is desirable to protect the cotton as it is picked from moisture as much as can conveniently be done, and to this end each hand when going into the field might be furnished with an india-rubber or oil cloth with which to cover his basket and protect the picked cotton from the rain of the day.

The accompanying drawing represents a convenient arrangement for carrying out my improved process. The building may be of any material preferred by the constructor. Its dimensions will of course vary with the average size of the crop, the only point to be regarded being that it shall possess sufficient capacity to contain all the cotton picked during a single day. The roof (B) may be extended in front of the main body of the building and have its projecting end supported by pillars (C). This extension of the roof forms a convenient shelter for protecting the cotton when the drawers are run out during rainy weather. The drawers are run in and out upon a strong framework (D) erected inside of the building in such manner as to leave sufficient space between the framework and walls for the passage of the attendant around the framework. This framework supports several tiers or ranges of horizontal beams or stringers ($d$) arranged parallel to each other and to the side walls of the building. These stringers are framed in pairs, and must have inserted in them strong rollers ($d'$) upon which the drawers may slide. Their distance apart vertically is regulated by the depth of the drawers (E) which should be about six inches. The drawers and framework being made to fit snugly close up so much of the front or fourth side as they occupy, the remainder being closed up in similar manner to the other three sides. The frame (D) is to be built proportionately strong to allow of drawers about three feet wide, six inches deep, and eighteen feet long (which would be the largest size of drawers that could conveniently be used to run in and out with ease) to hold about one hundred and fifty pounds of seed-cotton each.

A space is to be left between the top of one drawer and the bottom of the one next above it, and also between the sides of the drawers to admit of the heat passing between them, which will render it necessary that where the drawers run side by side each one should run upon its own stringers separately. The frame of the drawer must be made sufficiently strong to prevent it from sagging with the weight of the cotton. The bottom and sides may be made of perforated sheet-metal. Tubes of metal or wooden slats might also be used for this purpose; the object being to admit the free circulation of the heat through the cotton. A three-legged stand may be provided having hooks opposite each drawer to catch upon the handles when the drawer is run out.

The hot-air or steam pipes (F) may enter the room near to, but not touching the ground, and pass backward and forward in a coil under or around the drawers, in such manner as may be deemed most advantageous. A door may be provided for the entrance of the tender or attendant.

As the wet seed cotton is brought in from the field, the drawers are run out one at a time, filled, and returned to their places, until the day's picking is, in this way deposited. The hot air or steam upon being permitted to flow through the pipes, gradually evaporates the moisture contained in the cotton, which moisture is permitted to escape through holes ($a$) in the roof or walls. The attendant can readily ascertain the temperature by means of a thermometer suspended within the closet; and regulate the supply of hot air or steam accordingly. The cotton may be removed from the drawers as soon as dried; or the heat may be shut off and the cotton allowed to remain until required for ginning or spinning.

It is obvious that the mechanism above described may be modified in various ways without departing from the spirit of my invention; but as various methods of applying such variations to the accomplishment of the object sought to be attained would readily suggest themselves to the intelligent constructor, any further reference to them is deemed unnecessary here.

What I claim as my invention and desire to secure by Letters Patent, is—

The application of artificial heat to the purpose of drying wet seed-cotton by means of mechanism substantially as described.

In testimony whereof I have hereunto signed my name.

GEO. G. HENRY.

Witnesses:
WM. D. BALDWIN,
W. S. CLARY.